United States Patent [19]

Christian

[11] Patent Number: 4,779,647
[45] Date of Patent: Oct. 25, 1988

[54] ADJUSTABLE VALVE

[76] Inventor: Timothy T. Christian, 270 ½ Roswell Ave., Long Beach, Calif. 90803

[21] Appl. No.: 152,316

[22] Filed: Feb. 4, 1988

[51] Int. Cl.$^4$ .............................................. F16K 13/00
[52] U.S. Cl. .............................. 137/625.37; 251/210; 251/363
[58] Field of Search ........... 137/625.3, 625.33, 625.37; 251/210, 363

[56] References Cited

U.S. PATENT DOCUMENTS

| | | | |
|---|---|---|---|
| 2,684,688 | 7/1954 | Thornhill | 251/35 X |
| 2,782,800 | 2/1957 | Hillebrand | 137/625.38 |
| 2,927,767 | 3/1960 | Ray | 251/210 |
| 4,132,386 | 1/1979 | Lee | 251/191 |
| 4,471,810 | 9/1984 | Muchow | 137/625.37 |
| 4,569,370 | 2/1986 | Witt | 137/625.3 |
| 4,679,592 | 7/1987 | Lamb | 137/625.37 X |

Primary Examiner—Alan Cohan
Attorney, Agent, or Firm—W. Edward Johansen

[57] ABSTRACT

The present invention is an ajustable valve which includes a T-shaped fitting with a first bore, a stem, a bonnet and a valve mechanism with an outlet, a flow nozzle and a flow cone. The outlet is a cylinder with a bore of a first diameter. The outlet has a nozzle ledge and is fixedly coupled to the first bore. The flow nozzle is a cylinder with an inner sidewall and has a first open end and a second closed end. The flow nozzle has a first outer sidewall of the first diameter adjacent to the first open end and a second outer sidewall of a second diameter which is larger than the first diameter adjacent to the second closed end. The flow nozzle is slidably engaged within the outlet. The second outer sidewall has a plurality of orifices extending therethrough and communcating with the inner sidewall of the flow nozzle. The flow cone is a cylinder having an inner sidewall which slidably engages around the second outer sidewall of the flow nozzle. The flow cone is mechanically coupled to the stem so that the inner sidewall of the flow cone may travel along the second outer sidewall of the flow nozzle. The flow cone presses a seal against the nozzle ledge in order to mechanically set the seal.

1 Claim, 3 Drawing Sheets

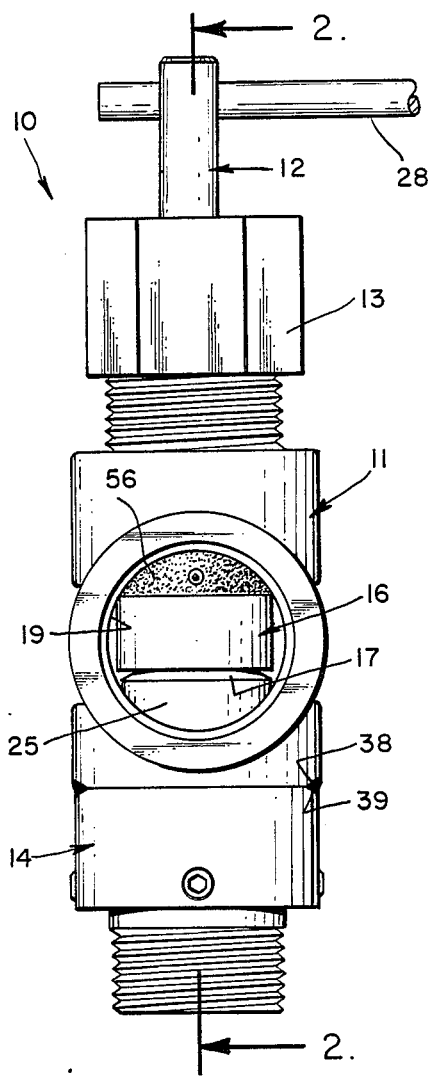
Fig. 1.
Fig. 3.
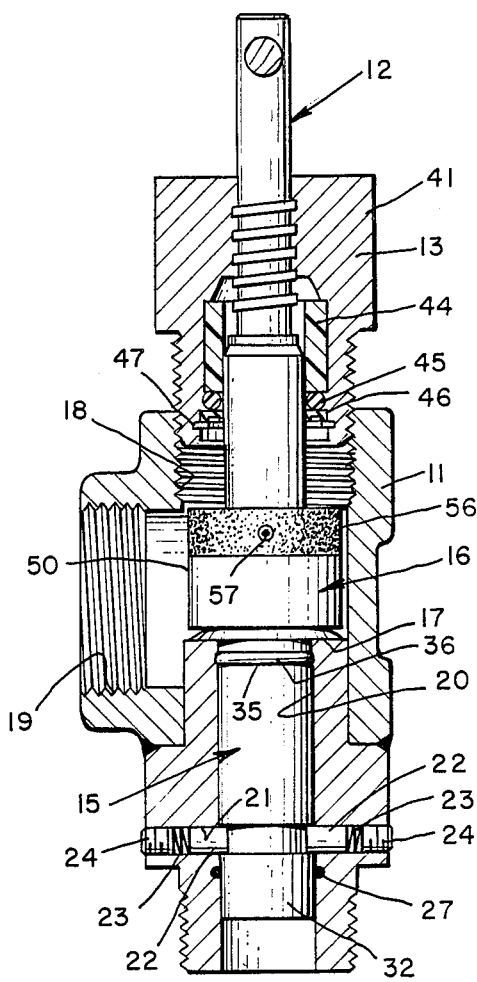
Fig. 2.
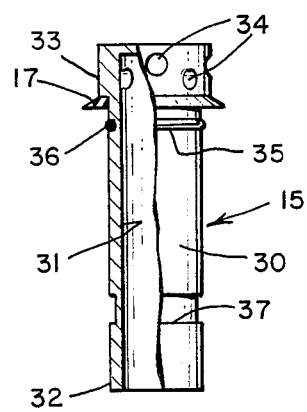
Fig. 4.

ADJUSTABLE VALVE

BACKGROUND OF THE INVENTION

1. Field of the Invention

The present invention relates to an adjustable valve and more particularly to an adjustable valve having a valve mechanism which includes a replaceable flow nozzle and a replaceable flow cone.

2. Description of the Prior Art

U.S. Pat. No. 2,684,688, entitled Automatic Valve and System, issued to Homer G. Thornhill on Jul. 27, 1954, teaches an adjustable valve which includes a T-shaped fitting, a stem and a bonnet. The T-shaped fitting has an inlet which is at its base. The T-shaped fitting also has an outlet which is at one of its arms. The stem projects through its other arm of the T-shaped fitting within the center of which the bonnet slidably supports the stem. The bonnet is sealed to the end of the T-shaped fitting by a ring gasket and is secured thereto. The bonnet has a pair of cylindrical bearings which support the stem. Within each of two annular grooves a neoprene o-ring is disposed between one of a pair of leather non-extrusion rings in order to form a pair of spaced sliding seals between the stem and the bonnet. The adjustable valve also includes a flow cone and a removable flow nozzle. The flow cone is mounted on the stem and cooperates with the removable flow nozzle which the T-shaped fitting threadedly supports within its outlet.

U.S. Pat. No. 4,132,386, entitled Valve Mechanism for a Control Valve, issued to Eugene O. Lee on Oct. 2, 1979, teaches an adjustable valve which includes a T-shaped fitting, a stem and a bonnet. The T-shaped fitting has a first bore extending therethrough and a second bore adjacent and perpendicular to the first bore. The stem has a first end and a second end and extends through a first end of the first bore. The bonnet forms a seal between the first bore and the stem. The adjustable valve also includes a valve mechanism for controlling the flow through the adjustable valve. The valve mechanism includes a flow nozzle and a flow cone. The flow nozzle has a bore which is axially aligned with the first bore of the T-shaped fitting and is disposed within the first bore adjacent to its second the end. The flow nozzle has a cylindrical inner sidewall and a truncated-conical outer sidewall adjacent to its top portion and a cylindrical outer sidewall adjacent to its bottom portion. The flow cone slidably engages around the outer cylindrical sidewall of the seat and is mechanically coupled to the stem so that its inner sidewall may travel along and adjacent to the outer sidewall of the flow nozzle. The flow travels between the truncated-conical outer sidewall of the flow nozzle and the inner sidewall of the flow cone so that it may impinge upon itself.

U.S. Pat. No. 4,679,592, entitled Valve Seat Design to Reduce Cavitation, issued to Paul C. Lamb on Jul. 14, 1987, teaches an adjustable valve which includes a valve body and a valve mechanism. The valve body has a chamber with an inlet passage and an outlet passage. The valve mechanism includes a flow cone and a flow nozzle which form a trim to reduce cavitation. The flow nozzle has a bore and is disposed in the chamber of the valve body between the inlet and outlet passages. An end portion on the flow nozzle closes the bore. A truncated conical surface on the flow nozzle has a plurality of orifices extending therethrough and communicating with the bore. The flow cone has a skirt portion and a pocket which has a truncated conical wall. The valve mechanism movably secures the flow cone in the chamber of the valve body such that a portion of the flow nozzle extends into the pocket in the flow cone and the skirt portion of the flow cone covers a portion of the plurality of orifices in order to form a plurality of tortuous flow paths. The flow cone and the flow nozzle are axially movable and have frustoconical facing surfaces which form an annulus therebetween to control flow. The flow nozzle has an external frustoconical surface and a plurality of pairs of ports communicating with an internal bore. The ports are aligned so that flow from each port impinges upon another within the chamber of the flow nozzle to reduce cavitation.

U.S. Pat. No. 2,782,800 and U.S. Pat. No. 2,927,767 teach adjustable valves which have flow cones which are conically shaped and which are to be inserted into a flow nozzle. The interface between the surface of the flow cone and the surface of the flow nozzle serves not only to control the flow through the adjustable valve itself, but also serves as the shutoff when the adjustable valve is closed. This interface is therefore subject to wear by erosion.

SUMMARY OF THE INVENTION

In view of the foregoing factors and conditions which are characteristic of the prior art it is the primary object of the present invention to provide an adjustable valve having a valve mechanism which includes a replaceable flow nozzle and a replaceable flow cone.

It is the another object of the present invention to provide an adjustable valve having a valve mechanism which includes a replaceable flow nozzle, a replaceable flow cone and an outlet which is machined to sufficiently close tolerances so that the replaceable flow nozzle and the flow cone may be incorporated into a standard T-shaped fitting.

It is the still another object of the present invention to provide an adjustable valve having a valve mechanism which includes a simple sealing system.

In accordance with the present invention an embodiment of an adjustable valve which includes a T-shaped fitting with a first bore, a stem, a bonnet and a valve mechanism with an outlet, a flow nozzle and a flow cone is described. The outlet is a cylinder with a bore of a first diameter. The outlet has a nozzle ledge and is fixedly coupled to the first bore. The flow nozzle is a cylinder with an inner sidewall and has a first open end and a second closed end. The flow nozzle has a first outer sidewall of the first diameter adjacent to the first open end and a second outer sidewall of a second diameter which is larger than the first diameter adjacent to the second closed end. The flow nozzle is slidably engaged within the outlet. The second outer sidewall has a plurality of orifices extending therethrough and communicating with the inner sidewall of the flow nozzle. The flow cone is a cylinder having an inner sidewall which slidably engages around the second outer sidewall of the flow nozzle. The flow cone is mechanically coupled to the stem so that the inner sidewall of the flow cone may travel along the second outer sidewall of the flow nozzle. The flow cone presses a seal against the nozzle ledge in order to mechanically set the seal.

The features of the present invention which are believed to be novel are set forth with particularity in the appended claims.

3

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a front elevational view of a first adjustable valve which is in its closed position and which has been constructed in accordance with the principles of the first embodiment of the present invention.

FIG. 2 is a side elevational view in cross-section of the first adjustable valve of FIG. 1 which has a first valve mechanism taken along line 2—2 of FIG. 1.

FIG. 3 is a front elevational view of an outlet of the first valve mechanism of the first adjustable valve of FIG. 1.

FIG. 4 is a front elevational view in partial cross-section of a flow nozzle of the first valve mechanism of the first adjustable valve of FIG. 1.

DESCRIPTION OF THE PREFERRED EMBODIMENT

Figure 5:
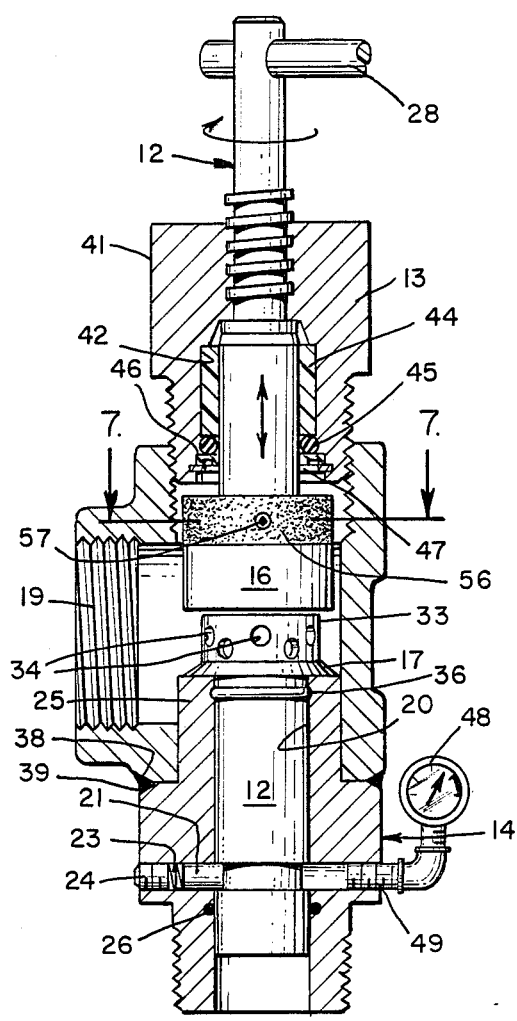
FIG. 5 is a side elevational view in cross-section of the first adjustable valve of FIG. 1 which is in its open poition and to which a pressure gauge has been attached.

In order to best understand the present invention it is necessary to refer to the following description of its preferred embodiment in conjunction with the accompanying drawing. Referring to FIG. 1 in conjunction with FIG. 2 an adjustable valve 10 includes a T-shaped fitting 11, a stem 12, a bonnet 13 and a valve mechanism with a first outlet 14, a first flow nozzle 15, a first flow cone 16 and a seal 17. The T-shaped fitting 11 has a first bore 18 with a first open end and a second open end and a second bore 19 with an open end which is the inlet of the first adjustable valve 10. The bonnet 13 is mechanically coupled to both the first bore 18 at its first open end. The first outlet 14 is a cylinder with a bore 20 of a first diameter. The first outlet 14 has four threaded lock holes 21 into each of which one of four lock pins 22 are inserted. Each lock pin 22 is resiliently secured in place by one of four springs 23 and one of four lock plugs 24. The first outlet 14 also has a nozzle ledge 25 on which the seal 17 rests and an o-ring groove 26 in which an elastomeric o-ring 27 is disposed. The stem 12 is threaded and has a handle 28 or a hand-wheel fixedly coupled thereto at a first end. The stem 12 also has a flange 29 which is disposed at a second end.

Referring to FIG. 3 in conjunction with FIG. 2 and FIG. 4 the first flow nozzle 15 is a cylinder 30 with an inner sidewall 31 and has a first open end and a second closed end. The first flow nozzle 15 has a first outer sidewall 32 of the first diameter adjacent to the first open end and a second outer sidewall 33 of a second diameter which is larger than the first diameter adjacent to the second closed end. The first flow nozzle 15 is slidably engaged within the first outlet 14. The second outer sidewall 33 has a plurality of orifices 34 extending therethrough and communicating with the inner sidewall 31 of the first flow nozzle 15. The first flow nozzle 15 has an o-ring groove 35 in which an elastomeric o-ring 36 is inserted and lock groove 37.

Figure 6:
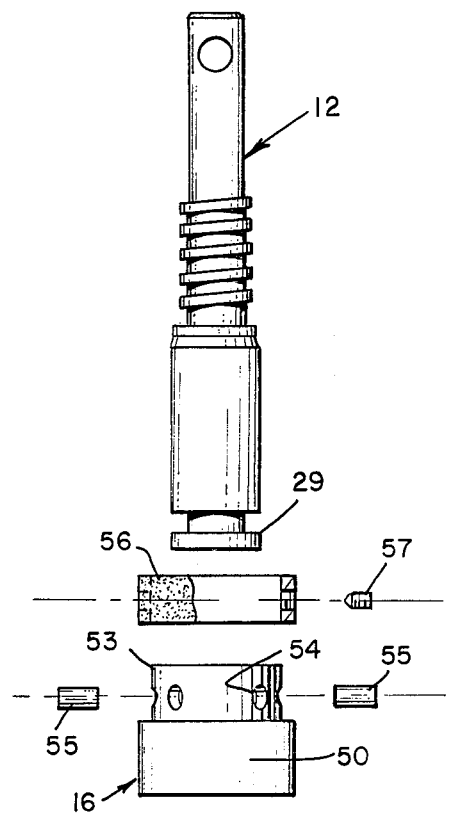
FIG. 6 is an exploded side elevational view of a stem and a flow cone of the first valve mechanism of the first adjustable valve of FIG. 1.

Referring to FIG. 5 in conjunction with FIG. 6 the bonnet 13 is a cylinder with an outer surface 41 and an inner sidewall 42. There is a threaded portion of the outer surface 41 to which threadedly couples the bonnet 13 to the first bore 18 at the first open end. There is a threaded portion of the inner surface 42 to which the stem 12 is threadedly coupled. There is a non-threaded portion of the inner surface 42. A sealing mechanism provides a seal between the stem 12 and the bonnet 13 and includes an elastomeric bearing 44, an elastomeric o-ring 45, a wiper 46 and a snap ring 47. The elastomeric o-ring 45 is disposed below the elastomeric bearing 44. The wiper 46 is disposed below the elastomeric o-ring 44. The snap ring 47 is disposed below the wiper 46 above the elastomeric o-ring groove 44. A pressure gauge 48 has an inlet 49 may be placed in one of four locking holes 21 in order to provide a warning when the first flow nozzle 15 has eroded.

Figure 8:
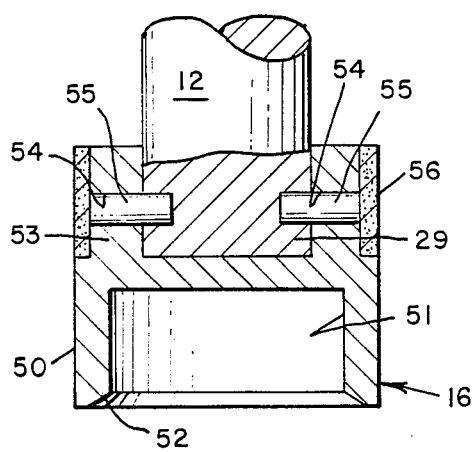
FIG. 8 is an elevational view in cross-section of the stem and the flow cone of the first valve mechanism of the first adjustable valve of FIG. 1.
Figure 7:
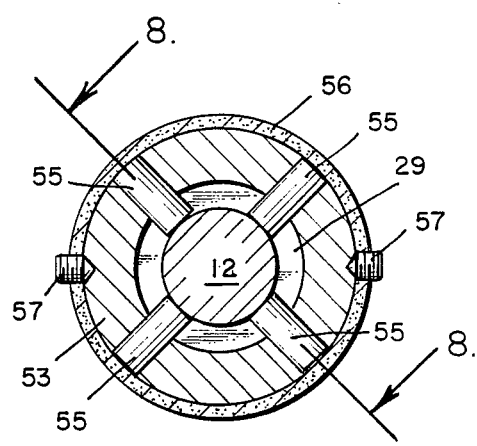
FIG. 7 is a longitudinal view in cross-section of the stem and the flow cone of the first valve mechanism of the first adjustable valve of FIG. 1 taken along the line 7—7 of FIG. 5.

Referring to FIG. 6 in conjunction with FIG. 7 and FIG. 8 the first flow cone 16 is a cylinder 50 with a first open end and a second closed end. The cylinder 50 has an inner sidewall 51 which slidably engages around the second outer sidewall 42 of the first flow nozzle 15 and a chamfered edge 52 at its first open end. The first flow cone 16 has a collar mount 53 which is hollow and on which four lock holes 54 are radially disposed. The flange 29 of the stem 12 is inserted into the collar mount 53. A first set of four lock pins 55 are placed in the lock holes 54 to secure the flange 29 of the stem 12 to the collar mount 53 of the first flow cone 16. A locking collar 56 is placed around the collar mount 53 in order to secure the first set of four lock pins 55 therein and has a pair of lock screws 57 which secures the locking collar 68 to the collar mount 53. The first flow cone 16 is mechanically coupled to the stem 12 so that its inner sidewall 51 may travel along the second outer sidewall 42 of the first flow nozzle 15. The chamfered edge 52 of the cylinder 50 of the first flow cone 16 presses the seal 17 against the nozzle ledge 25 in order to mechanically set the seal 17.

Figure 9:
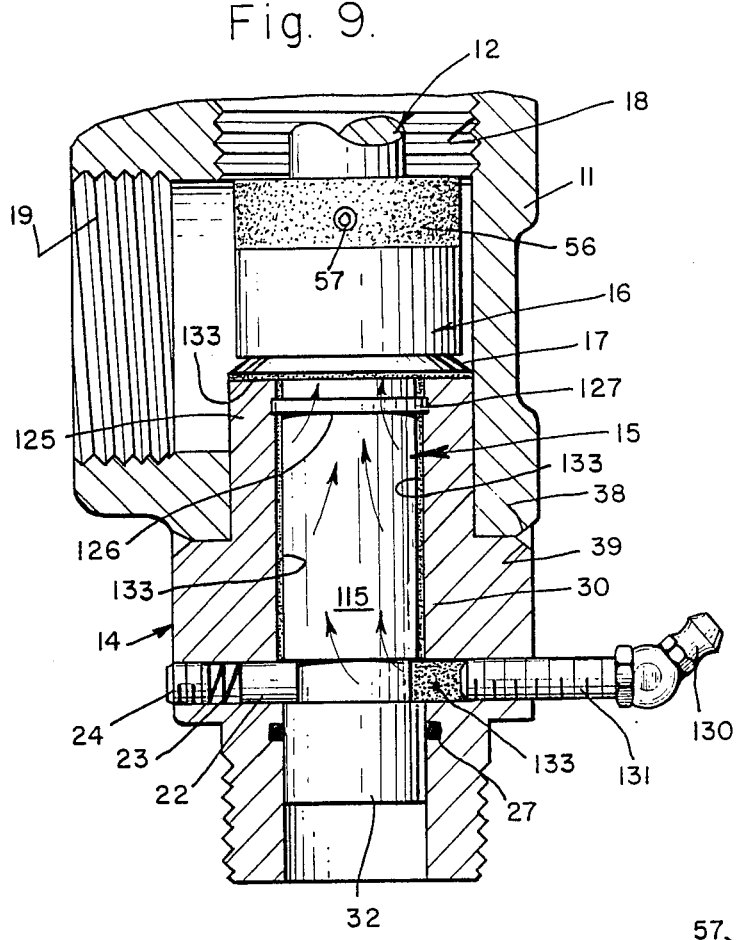
FIG. 9 is an enlarged, partial side elevational view in cross-section of a second adjustable valve having a U-shaped gasket and second valve mechanism which has a flow cone and a seal with the flow cone being in its closed position and which has been constructed in accordance with the principles of the second embodiment of the present invention.

Referring to FIG. 9 a second adjustable valve 110 includes a second outlet 114, a second flow nozzle 115 and a a second flow cone 116. The second outlet 114 is a cylinder with a bore 120 of a first diameter. The second outlet 114 has four threaded lock holes 121. The second outlet also has a nozzle ledge 125 and a gasket groove 126. The seal 17 rests on the nozzle ledge 125. A U-shaped gasket 127 is disposed in the gasket groove 126. The second flow nozzle 115 is a cylinder 128 with an outer sidewall 129. The U-shaped gasket 127 is disposed adjacent to the outer sidewall 129 of the second flow nozzle 115.

Figure 10:
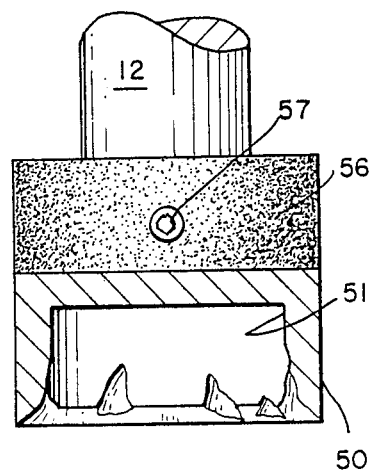
FIG. 10 is an elevational view in partial cross-section of the stem and the flow cone of the second valve mechanism of the second adjustable valve of FIG. 9 with portions of the flow cone being eroded.
Figure 11:
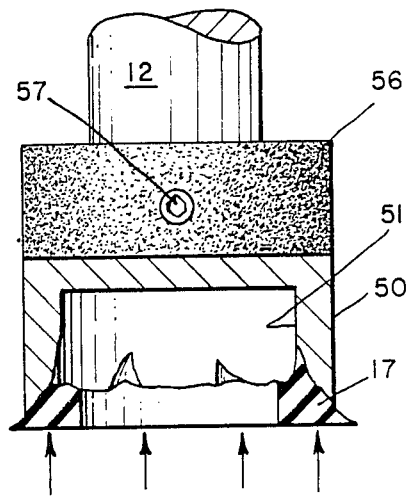
FIG. 11 is an elevational view in partial cross-section of the stem and the flow cone of the second valve mechanism of the second adjustable valve of FIG. 9 with the flow cone of FIG. 10 and the U-shaped gasket maintaining a high-pressure grease sealant against the seal thereby deforming it into the eroded portions of the flow cone.
Figure 12:
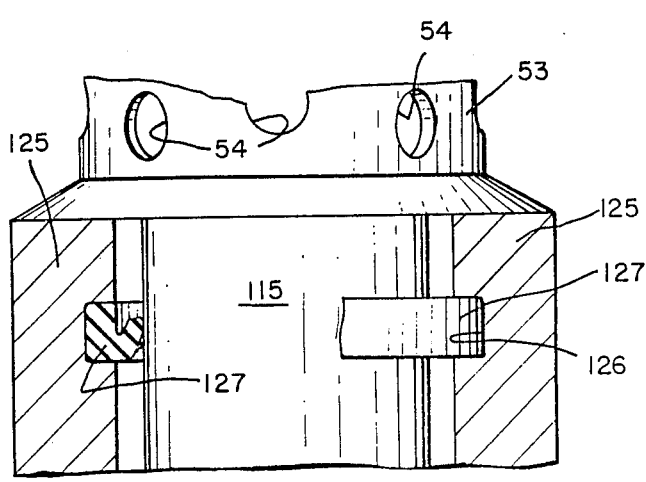
FIG. 12 is an enlarged, partial side elevational view in cross-section of an outlet of the second adjustable valve of FIG. 8.

Referring to FIG. 10 in conjunction with FIG. 9, FIG. 11 and FIG. 12 portions of inner sidewall 51 of the second flow cone 116 have been eroded by the high pressure fluid flow. A grease lug 130 with an inlet 131 is threadedly coupled into one of the four threaded lock holes 121 of the outlet 114 so that a high-pressure grease sealant 132 may be pumped into the inner bore 120 of the outlet 114 surrounding. The U-shaped gasket 127 maintains the high-pressure grease sealant 133 against the seal in order to deform it into the eroded portions of the inner sidewall 51 of the second flow cone 116 so that the second adjustable valve 110 may be shut-off.

From the foregoing it can be seen that a valve mechanism having a replaceable flow nozzle and a replaceable flow cone for use in an adjustable valve has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A valve mechanism for use in an adjustable valve which includes:
   a. a T-shaped fitting which has a first bore with a first open end and a second open end and a second bore with an open end;
   b. a stem which extends through the first bore at its first open end; and
   c. a bonnet which is mechanically coupled to both the first bore at its first end and the stem in order to form a seal therebetween, said valve mechanism comprising,
   a. an outlet which is a cylinder with a bore of a first diameter and which has a nozzle ledge, said outlet being fixedly coupled to the first bore at its second open end;
   b. a flow nozzle which is a cylinder with an inner sidewall and which has a first open end and a second open end, said flow nozzle having a first outer sidewall of the first diameter adjacent to said first open end and a second outer sidewall of a second diameter which is larger than the first diameter adjacent to said second open end, said flow nozzle being slidably engaged within said outlet, said second outer sidewall having a plurality of orifices extending therethrough and communicating with said inner sidewall of said flow nozzle;
   c. a flow cone which is a cylinder having an inner sidewall which slidably engages around said second outer sidewall of said flow nozzle, said flow cone being mechanically coupled to the stem so that said inner sidewall of said flow cone may travel along said second outer sidewall of said flow nozzle; and
   d. a seal which said flow cone presses against said nozzle ledge in order to mechanically set said seal.

* * * * *